United States Patent [19]

Anderson et al.

[11] 4,107,771

[45] Aug. 15, 1978

[54] CIRCUIT FOR SHUTTING DOWN AN INVERTER

[75] Inventors: Thomas E. Anderson, Normal; Ole N. Ibsen, Bloomington, both of Ill.; Loren H. Walker, Salem, Va.

[73] Assignee: General Electric Company, New York, N.Y.

[21] Appl. No.: 770,736

[22] Filed: Feb. 22, 1977

[51] Int. Cl.² .............................................. H02M 1/18
[52] U.S. Cl. ........................................ 363/58; 363/96; 363/79
[58] Field of Search ...................................... 363/55–58, 363/71, 79, 96, 135, 136

[56] References Cited

U.S. PATENT DOCUMENTS

| | | | |
|---|---|---|---|
| 3,247,447 | 4/1966 | Flairty | 363/58 |
| 3,852,656 | 12/1974 | Bourbeau | 363/58 |
| 3,882,370 | 5/1975 | McMurray | 363/135 |
| 4,041,365 | 8/1977 | Peak et al. | 363/58 |

Primary Examiner—William M. Shoop
Attorney, Agent, or Firm—S. A. Young; U. C. Bernkopf

[57] ABSTRACT

A circuit for shutting down an inverter that includes at least a series combination of first and second gate controlled rectifiers and a load. The circuit is comprised of means for sensing the direction and magnitude of the instantaneous current flowing through the load, and means responsive to the direction and magnitude of the sensed current for generating an output signal when the magnitude of the current exceeds a predetermined threshold level and the current is flowing in a first direction. The circuit further comprises means responsive to the simultaneous receiving of a shutdown signal and the generated output signal for further generating a gating pulse to be applied to the second gate controlled rectifier to cause the current flowing through the load to quickly extinguish. Further included is means responsive to the shutdown signal for inhibiting further regular gating of the gate controlled rectifiers to ensure quick turn off of the inverter.

6 Claims, 2 Drawing Figures 4,107,771

CIRCUIT FOR SHUTTING DOWN AN INVERTER

BACKGROUND OF THE INVENTION

1. Field of the Invention

This invention relates to inverters, and, more particularly, to an inverter having circuit means for quickly shutting down and isolating the inverter from a critical load.

2. Description of the Prior Art

Inverters have been used in uninterruptible power systems (UPS) to convert a DC voltage to an AC voltage so as to provide a reliable power source to a critical bus, which bus in turn provides power to a critical load such as a computer. This critical load must have a voltage source which does not deviate in magnitude or frequency from very tight specifications in order to ensure its proper operation. Thus, quite often, a number or plurality of redundant uninterruptible power systems are used to supply the critical bus and load. If, however, there is a malfunction in the inverter of any UPS system, this inverter can adversely effect the overall voltage of the critical bus, thereby endangering the continued operation of computers which receive their power from that bus. In one failure mode, an inverter can be receiving an excess of reverse power from the critical bus. This could result in other redundant UPS systems supplying power to the failing inverter, thereby endangering the integrity of the critical bus.

OBJECTS OF THE INVENTION

It is therefore an object of this invention to provide a circuit which is capable of responding to a shutdown signal indicative of a malfunction in an inverter to cause the inverter to immediately shut down, which would, in turn, result in the rapid removal of a faulty UPS from a critical bus.

It is a further object of this invention to provide a circuit for causing an inverter to shut down in such a manner that if the inverter were receiving reverse power from a critical bus, the inverter, which is in the process of being shut down, will provide a high impedance to the critical bus so as to limit the deleterious effects of the flow of reverse power from the critical bus to the failing inverter.

Other objects of the invention will be pointed out hereinafter.

SUMMARY OF THE INVENTION

According to a broad aspect of the invention, there is provided a circuit for quickly shutting down a failing inverter. The inverter includes a load, a series combination of at least first and second gate control rectifiers connected across a direct current source of potential, and commutating means coupled to each of the rectifiers, wherein one end of the load is connected to a point between the first and second gate control rectifiers. The means for shutting down the failing inverter is comprised of means for sensing the direction and magnitude of the instantaneous current flowing through the load, means responsive to the direction and magnitude of the sensed current for generating a first output signal when the magnitude of the current exceeds a predetermined threshold level and the current is flowing in the first direction, means responsive to the simultaneous receiving of a shutdown signal and the generated first output signal for generating a first gating pulse to be applied to the second gate controlled rectifier to cause the current flowing through the load to quickly extinguish, and means responsive to the shutdown signal for inhibiting further regular gating of either of the first or second gate controlled rectifiers to ensure quick turn off of the gate controlled rectifiers. The means for shutting down the failing inverter is further comprised of means responsive to the direction and magnitude of the sensed current for generating a second output signal when the magnitude of the current exceeds the predetermined threshold level and the current is flowing in a direction opposite the first direction, and means responsive to the simultaneous receiving of the shutdown signal and the generated second output signal for generating a second gating pulse to be applied to the first gate controlled rectifier to cause the current flowing through the load to quickly extinguish.

DESCRIPTION OF THE PREFERRED EMBODIMENTS

Figure 1:
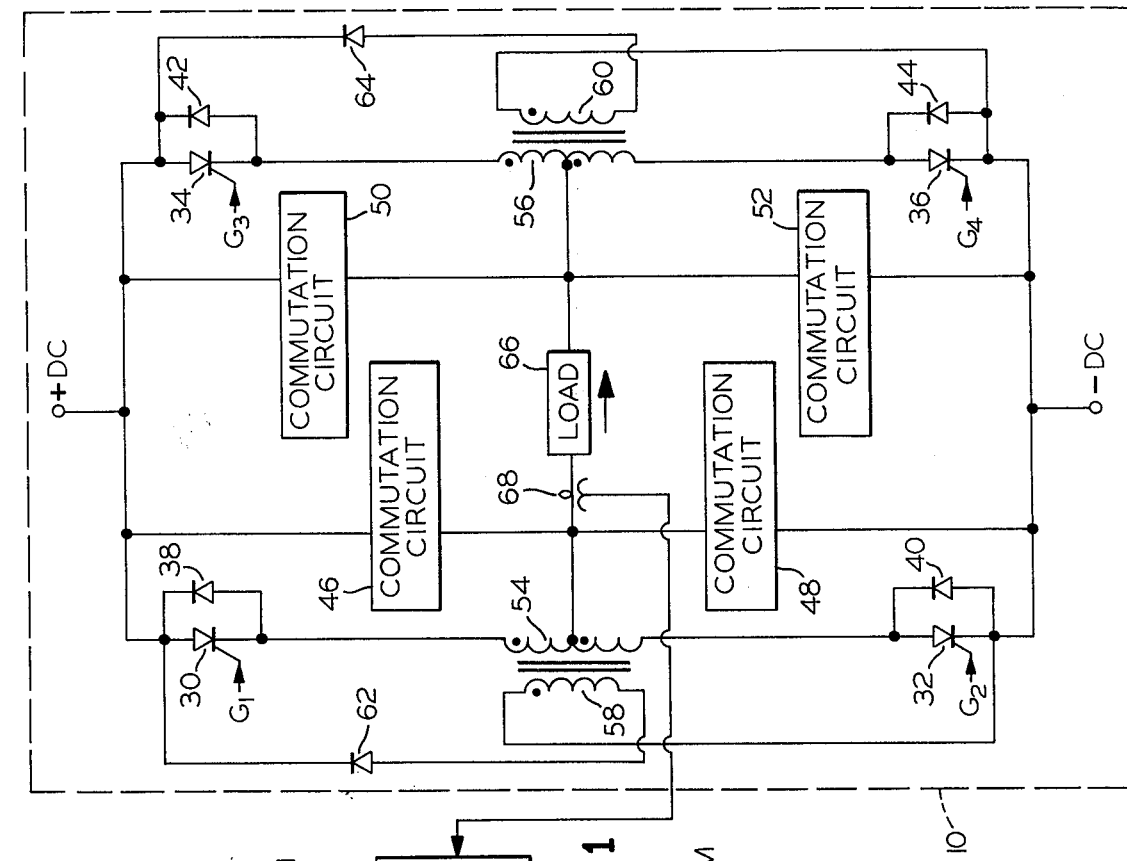
FIG. 1 is an overall block diagram of the circuit for shutting down a failing inverter.
Figure 1:
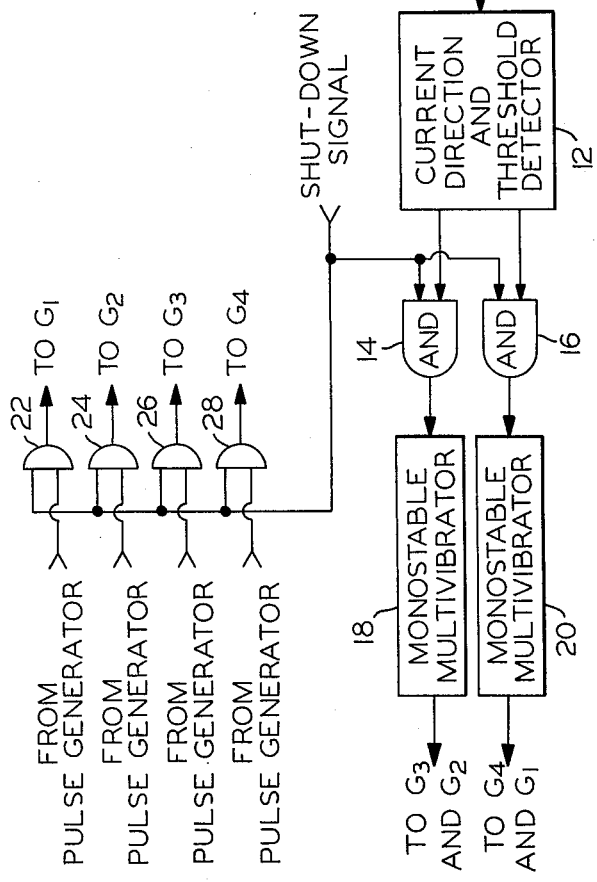
Figure 2:
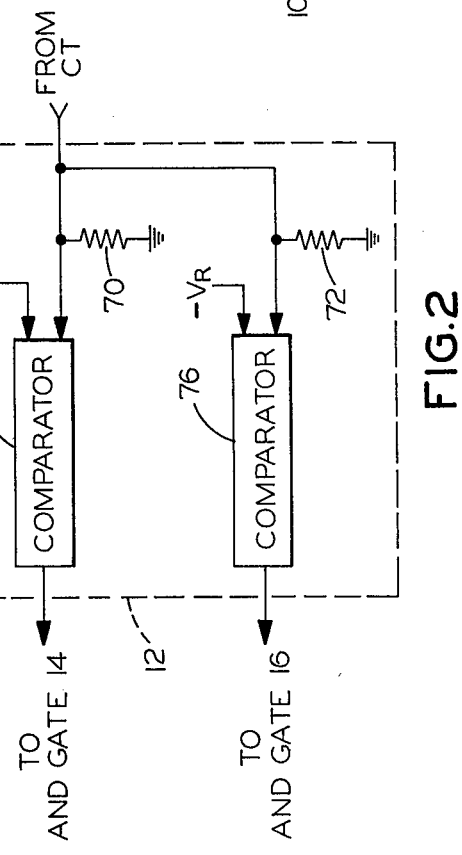
FIG. 2 is a more detailed circuit representation of the current direction and threshold detector shown in FIG. 1.

Referring to FIGS. 1 and 2, the invention will now be explained. As shown in FIG. 1, there is provided a self-commutating inverter 10, a current direction and threshold detector 12, first and second AND gates 14 and 16, first and second monostable multivibrators 18 and 20, and inhibit gates 22, 24, 26 and 28.

Inverter 10 is comprised of first and second gate controlled rectifiers 30 and 32 within one leg of the inverter and third and fourth gate controlled rectifiers 34 and 36 within another leg of the inverter; first, second, third and fourth diodes 38, 40, 42 and 44; first, second, third and fourth commutation circuits 46, 48, 50 and 52; first and second current limiting spanning reactors 54 and 56; first and second secondary windings 58 and 60; and first and second blocking diodes 62 and 64. Diodes 38, 40, 42 and 44 are connected in parallel and reverse polarity relationship across SCR's 30, 32, 34 and 36 respectively. Reactor 54 is connected between the cathode of SCR 30 and the anode of SCR 32, while reactor 56 is connected between the cathode of SCR 34 and the anode of SCR 36. The anodes of SCR's 30 and 34 are electrically connected to the +DC terminal of a DC power supply (not shown), while the cathodes of SCR's 32 and 36 are electrically connected to the −DC terminal of the DC power supply. Commutation circuits 46 and 50 are electrically connected between the +DC terminal and the center taps of respective reactors 54 and 56, while commutation circuits 48 and 52 are electrically connected between the −DC terminal and the center taps of respective reactors 54 and 56. Secondary windings 58 and 60 are respectively inductively coupled, as shown in FIG. 1, to respective reactors 54 and 56, wherein one end of secondary windings 58 and 60 are electrically connected to the −DC terminal, while the other end of windings 58 and 60 are connected to respective anodes of blocking diodes 62 and 64. The cathodes of blocking diodes 62 and 64 are electrically connected to the +DC terminal. The center tap of the respective reactors 54 and 56, in this instance, provide an effective output terminal for each leg of the inverter, and the series combination of a load 66 and a current transformer 68 is connected between the respective center tap terminals of reactors 54 and 56.

Respective gate terminals $G_1$, $G_2$, $G_3$ and $G_4$ of respective SCR's 30, 32, 34 and 36 are electrically connected to receive gating pulses from a gating pulse generator (not shown) in order that the proper SCR's turn on in accordance with a predetermined sequence necessary to achieve the desired output voltage at the required frequency from a UPS. The UPS can be comprised of a single or multiphase inverter, wherein each inverter can include one or more legs per phase. A more detailed description of the operation of inverter 10 is provided in Reissue Patent No. 26,342 assigned to the same assignee as the assignee of the present invention. Furthermore, while inverter 10 is described as a self-commutating inverter having two legs, other types of self-commutating inverters may also be used. Inverter 10 can even be a forced commutating inverter of the type described in U.S. Pat. No. 3,207,974, also assigned to the same assignee as the assignee of the present invention. Also, a further description of the generator of gating pulses used for properly driving the SCR's of the inverter can be found in Chapter 4 of the Silicon Controlled Rectifier Manual, second edition, published by the General Electric Company, 1961.

Current transformer 68, which as stated above is in series with load 66, provides a means for sensing the direction and magnitude of the instantaneous current flowing through the load. The output of current transformer 68 is electrically connected to the input of current direction and threshold detector 12. If the sensed current is flowing through the load in a first direction (as indicated by the arrow in FIG. 1) and at a magnitude greater than or equal to a predetermined threshold value, a first signal is generated at the output of detector 12 and is applied to one input of AND gate 14, and, if the sensed current is flowing in the opposite direction through the load at a magnitude greater than or equal to the predetermined threshold value, then a second signal is generated at the output of detector 12 and is applied to one input terminal of AND gate 16. Whenever there is a serious fault detected within the UPS system, such as the flow of reverse power into the inverter or a malfunction in the switching of the inverter, a shutdown signal is applied to the input of both AND gates 14 and 16. If the first generated signal and the shutdown signal are simultaneously applied to the input of AND gate 14, a signal will be generated at the output of AND gate 14 which will then be applied to the input of monostable multivibrator 18. This will cause multivibrator 18 to generate a first gating pulse to be applied to the gates of SCR's 32 and 34 to cause current flowing through the load to quickly extinguish. Similarly, if the second generated signal and the shutdown signal are simultaneously applied to the input of AND gate 16, a signal will be generated at the output of AND gate 16 which will be applied to the input of monostable multivibrator 20. This will cause multivibrator 20 to generate a second gating pulse to be applied to gates of SCR's 30 and 36 to cause the current flowing through the load to quickly extinguish. It should be understood that multivibrators 18 and 20 can be any standard circuit for generating a pulse of sufficient duration to switch on an SCR. The previously described shutdown signal can also be applied to control input terminals of inhibit gates 22, 24, 26 and 28, wherein these inhibit gates provide a means responsive to the shutdown signal for inhibiting further regular gating of any of the SCR's to ensure quick turn off of the inverter by preventing the regular gating pulses that are normally applied to the gates of the SCR's from passing through the inhibit gates when a shutdown signal is present.

As shown in FIG. 2, current direction and threshold detector 12 can be comprised of power resistors 70 and 72 and standard voltage comparator circuits 74 and 76. Resistors 70 and 72 are connected between the output from the current transformer and circuit ground and are selected to have a resistive value necessary to cause the sensed load current to be converted to a voltage signal that can be applied to an input of each of comparator circuits 74 and 76. A reference voltage $+V_R$ is applied to another input of comparator 74, while another reference voltage $-V_R$ is applied to another input terminal of comparator 76. The magnitude of $+V_R$ and the resistive value of resistor 70 are selected so that when the sensed current flowing through the load in a first direction causes a positive voltage to be generated across resistor 70 at a magnitude equal to or greater than $+V_R$, then the previously referred to first generated signal is generated at the output of comparator 74 and is applied to the input of AND gate 14. Similarly, the magnitude of $-V_R$ and the resistive value of resistor 72 are also selected so that when the sensed current flowing through the load in the opposite direction causes a negative voltage to be generated across resistor 72 at a magnitude equal to or greater than $-V_R$, then the previously referred to second generated signal is generated at the output of comparator 76 and is applied to the input of AND gate 16. The predetermined trip point for comparators 74 and 76 are set high enough to ensure that once the shutdown gating pulses are generated, current flowing through the load will not diminish to zero and reverse direction prior to the time necessary to commutate off both SCR's in one leg. Thus, the predetermined threshold current $$I_T \geq (V_{cc} \Delta T/L$$

wherein
 $V_{cc}$ is equal to the voltage of the DC power supply,
 $\Delta T$ is equal to the time necessary to commutate off both the SCR's in one leg, and
 L is equal to the inductance of load 66 inasmuch as the load is generally the primary of a transformer, and is therefore an inductive load.

Thus, once the predetermined threshold current $(I_T)$ is calculated, the values of resistors 70 and 72 and the magnitudes of the reference voltages applied to comparators 74 and 76 are readily determined.

In operation, if it is desired that the inverter be quickly shut down due to a fault in either the inverter or other parts of a UPS system, a shutdown signal will be applied to AND gates 14 and 16. If the sensed instantaneous current flowing through current transformer 68 and load 66 is flowing in the direction indicated in FIG. 1, and is of the magnitude greater than or equal to the predetermined threshold current $(I_T)$, the voltage across resistor 70 in FIG. 2 will be positive and greater than or equal to $+V_R$, thereby causing the generation of the first signal at the output of comparator 74, which signal is applied to the input of AND gate 14. This will cause a signal at the output of AND gate 14 to be generated and applied to the input of monostable multivibrator 18, which, in turn, will cause a first gating pulse to be generated at the output of the multivibrator. This first gating pulse will be applied to the gates of SCR's 32 and 34. SCR's 32 and 34 will then turn on, thereby initiating a commutating cycle which will cause SCR's 30 and 36 to commutate off within a normal commutating interval, usually 34 microseconds in duration. The manner in which these SCR's commutate off is well known, and is further described in U.S. Pat. No. Re. 26,342 referred to above. As soon as SCR's 30 and 36 are off, the current flowing through the inductive load continues to flow through diodes 40 and 42, thereby causing SCR's 32 and 34 to turn off. Thus, within the time ΔT, which is usually considerably less than 100 microseconds, all of the SCR's within two legs of an inverter can be turned off before the direction of current flowing through the load has reversed itself. The current continues to flow through the load and through diodes 40 and 42, but in view of the fact that the polarity of the voltage of the power supply will be opposing the flow of current through the load, the power supply will appear as a relatively high impedance source. Thus, if the current flowing through the load is due to reverse power flowing from the critical bus to the primary winding (load) of the inverter, the relatively high impedance provided by the power supply, under these circumstances, will prevent any serious disturbance to the critical bus while the load current is reducing to zero. In the example just described, the current will rapidly reduce to zero within a time determined by the inductance of the load and the value of external capacitor filters that are used at the output of the UPS. This time will generally be well less than 1 millisecond in duration. If the output of the UPS is operating at 60 cycles, then the period of one half cycle of operation is approximately 8 milliseconds, and it is clear that the inverter will shutdown well with one half of the time period of the output signal of the UPS. Similarly, when a shutdown signal is applied to the input of AND gates 14 and 16, if the current flowing through load 66 and current transformer 68 is in the direction opposite the direction shown in FIG. 1, then the voltage generated across resistor 72 will be of a negative polarity. If this negative polarity signal is of a magnitude greater than or equal to the reference voltage $-V_R$ applied to comparator 76, then the second signal would be generated from the output of comparator 76. This would, in turn, cause a signal to be generated at the output of AND gate 16, which signal is coupled to the input of multivibrator 20. A second gating pulse would then be generated at the output of multivibrator 20, which second gating pulse would be applied to the gates of SCR's 30 and 36. This would cause SCR's 30 and 36 to turn on, thereby initiating the commutation cycle which would cause SCR's 32 and 34 to turn off. Once SCR's 30 and 32 are commutated on, the current continues to flow through the load and through diodes 38 and 44, thereby causing SCR's 30 and 36 to turn off. Inasmuch as the polarity of the DC power supply is still bucking the flow of load current, the current flowing through the load will still rapidly reduce to zero within the same time of period as when the current is flowing through the load in the first direction. Furthermore, irrespective of the direction that the current is flowing through the load, since the shutdown signal is also applied to the control input terminals of inhibit gates 22, 24, 26 and 28, the regular gating pulses, which are normally applied to the SCR's to cause the inverter to operate in its usual manner, will be prevented from being applied to the gates of the SCR's. Therefore, none of the SCR's will turn on, and both legs of the inverter will remain off, thus ensuring quick turn off of the inverter.

While the inverter shown in FIG. 1 describes the load as being connected between two inverter legs, this invention could be applied to an inverter having only one leg, wherein one end of the load is still connected to the center tap of the reactor in that leg, while the other end of the load is connected to a cell of the DC power supply which is at half the potential of the overall power supply. Alternatively, this other end of the battery can be connected to the midpoint between a series combination of two capacitors of equal value, which capacitors are connected across the full potential of the DC battery. Under either of these circumstances, if only the first leg comprised of SCR's 30 and 32 were used, and the current were flowing through the load in the first direction shown in FIG. 1, when a shutdown signal appears and the current flowing through the load exceeds the predetermined threshold value, a gating pulse generated by multivibrator 18 will be applied only to gate $G_2$ of SCR 32 to initiate the quick turn off cycle for the inverter leg. Similarly, if the current were flowing in the direction opposite the direction indicated in FIG. 1, the generated turn off gating pulse from multivibrator 20 would be applied to gate $G_1$ of SCR 30 to initiate the turn off cycle for the inverter. Where one inverter leg is used, only half the potential of the DC power supply will be applied to buck the flow of load current when the inverter is being shut down, and thus during shut down, the power supply will effectively provide half the impedance than would otherwise be provided when the load is connected between two inverter legs.

Thus, by sensing the direction and magnitude of current flowing through the load of an inverter, it is possible to initiate the complete shut down of the inverter within a fraction of the operating cycle of the inverter. It should be understood that if a shutdown signal first appears within a dead band when the instantaneous current flowing through the load is less than the predetermined threshold value, no turn off gating pulses will be generated by either multivibrator until the direction of current flowing through the the load reverses and again exceeds the predetermined threshold value. However, during this just described dead band when the current flowing in either direction through the load is less than the predetermined threshold value, if all the SCR's naturally commutate off, and in view of the fact that further gating of the SCR's is inhibited by the shutdown signal, the inverter may shut down during this dead band. However, if the inverter does not naturally commutate off during this dead band, then turn off gating pulses will be generated by either of monostable multivibrators 18 or 20 to initiate the quick turn off of the inverter once the instantaneous current flowing through the load is greater than or equal to the predetermined threshold value.

Although the invention has been described with reference to specific embodiments thereof, numerous modifications are possible without departing from the invention, and it is desirable to cover all modifications falling within the spirit and scope of this invention.

What we claim as new and desire to secure by Letters Patent of the United States is:

1. In combination, a self-commutating inverter and means for shutting down said inverter, said inverter including a load and at least first and second legs connected across a direct current source of potential, each leg including a series combination of at least first and second gate controlled rectifiers, at least first and second diodes connected in parallel and reverse polarity relationship across said first and second gate controlled rectifiers respectively, a commutating interval current limiting center tapped reactor connected in series and interposed between said rectifiers, and commutating means connected to the center tap of said reactor, said load being connected between the center tapped reactors of the respective first and second legs, said means for shutting down said inverter comprising:
  (a) means for sensing the instantaneous direction and magnitude of the instantaneous current flowing through said load;
  (b) means responsive to the direction and magnitude of the current sensed for generating a first output signal when the magnitude of the current exceeds a predetermined threshold level and is flowing in a first direction, and for generating a second output signal when the current exceeds the predetermined magnitude and is flowing in a direction opposite the first direction;
  (c) means responsive to the simultaneous receiving of a shutdown signal and the generated first output signal for generating a first gating pulse to be applied to said second gate controlled rectifier in said first leg and to said first gate controlled rectifier in said second leg to cause the current flowing through said load to quickly extinguish;
  (d) means responsive to the simultaneous receiving of the shutdown signal and the generated second output signal for generating a second gating pulse to be applied to said first gate controlled rectifier in said first leg and to said second gate controlled rectifier in said second leg to cause the current flowing through said load to quickly extinguish; and
  (e) means responsive to the shutdown signal for inhibiting further regular gating of said first and second gate controlled rectifiers in either of said first and second legs to ensure quick turn off of said inverter.

2. A combination according to claim 1 wherein said load is an inductive load.

3. A combination according to claim 1 wherein said sensing means is a current transformer in series with said load.

4. In combination, a self-commutating inverter and means for shutting down said inverter, said inverter including a load, a series combination of at least first and second gate controlled rectifiers connected across a direct current source of potential, a commutating interval current limiting center tapped reactor connected in series and interposed between said rectifiers, and commutating means connected to the center tap of said reactor, said load having one end connected to the center tap of said reactor, said means for shutting down said inverter comprising:
  (a) means for sensing the direction and magnitude of the instantaneous current flowing through said load;
  (b) means responsive to the direction and magnitude of the current sensed for generating a first output signal when the magnitude of the current exceeds a predetermined threshold level and is flowing in a first direction, and for generating a second output signal when the current exceeds the predetermined magnitude and is flowing in a direction opposite the first direction;
  (c) means responsive to the simultaneous receiving of a shutdown signal and the generated first output signal for generating a first gating pulse to be applied to said second gate controlled rectifier to cause the current flowing through said load to quickly extinguish;
  (d) means responsive to the simultaneous receiving of the shutdown signal and the generated second output signal for generating a second gating pulse to be applied to said first gate controlled rectifier to cause the current flowing through said load to quickly extinguish; and
  (e) means responsive to the shutdown signal for inhibiting further regular gating of either of said first and second controlled rectifiers to ensure quick turn off of said inverter.

5. In combination, an inverter and means for shutting down said inverter, said inverter including a load, a series combination of at least first and second gate controlled rectifiers connected across a direct current source of potential, and commutating means coupled to each of said rectifiers, said load having one end connected to a point between said first and second gate controlled rectifiers, said means for shutting down said inverter comprising:
  (a) means for sensing the direction and magnitude of the instantaneous current flowing through said load;
  (b) means responsive to the direction and magnitude of the current sensed for generating a first output signal when the magnitude of the current exceeds a predetermined threshold level and is flowing in a first direction;
  (c) means responsive to the simultaneous receiving of a shutdown signal and the generated first output signal for generating a first gating pulse to be applied to said second gate controlled rectifier to cause the current flowing through said load to quickly extinguish; and
  (d) means responsive to the shutdown signal for inhibiting further regular gating of either of said first and second gate controlled rectifiers to ensure quick turn off of said inverter.

6. The combination according to claim 5, wherein said means for shutting said inverter down is further comprised of:
  (a) means responsive to the direction and magnitude of the current sensed for generating a second output signal when the current exceeds the predetermined magnitude and is flowing in a direction opposite the first direction; and
  (b) means responsive to the simultaneous receiving of the shutdown signal and the generated second output signal for generating a second gating pulse to be applied to said first gate controlled rectifier to cause the current flowing through said load to quickly extinguish.

* * * * *